(12) United States Patent
Okuhara

(10) Patent No.: US 11,106,400 B2
(45) Date of Patent: Aug. 31, 2021

(54) IMAGE PRINTING APPARATUS PRINTING OBTAINED IMAGE BASED ON A SATISFIED PRINT PERMISSION CONDITION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Ryusuke Okuhara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/539,047

(22) Filed: Aug. 13, 2019

(65) Prior Publication Data

US 2020/0073598 A1 Mar. 5, 2020

(30) Foreign Application Priority Data

Sep. 3, 2018 (JP) .............................. JP2018-164544

(51) Int. Cl.
*G06F 3/12* (2006.01)
*H04N 5/232* (2006.01)

(52) U.S. Cl.
CPC ............ *G06F 3/1205* (2013.01); *G06F 3/128* (2013.01); *G06F 3/1242* (2013.01); *G06F 3/1265* (2013.01); *G06F 3/1292* (2013.01); *H04N 5/23229* (2013.01); *H04N 5/232939* (2018.08)

(58) Field of Classification Search
CPC ........... H04N 1/00251; H04N 1/00307; H04N 2201/0084; H04N 2201/32–3298; G06F 3/1292; G06F 3/1205; G06F 3/1265; G06F 3/1242; G06F 3/128
USPC ...... 348/207.2, 231.99–231.9, 207.99, 231.5, 348/231.6, 231.3
See application file for complete search history.

(56) References Cited

U.S. PATENT DOCUMENTS

| | | | | |
|---|---|---|---|---|
| 8,923,551 B1 * | 12/2014 | Grosz | ................ | H04N 1/00161 382/100 |
| 8,935,322 B1 * | 1/2015 | Grosz | ................ | G06F 3/04842 709/203 |
| 8,958,662 B1 * | 2/2015 | Grosz | ................... | G06T 3/4038 382/118 |
| 8,990,672 B1 * | 3/2015 | Grosz | ................... | G06F 40/186 715/202 |

(Continued)

FOREIGN PATENT DOCUMENTS

| JP | 2008-270934 A | 11/2008 |
|---|---|---|
| JP | 2008270934 A * | 11/2008 |

*Primary Examiner* — Nicholas Pachol
(74) *Attorney, Agent, or Firm* — Venable LLP

(57) ABSTRACT

An image printing apparatus includes a memory containing instructions, and a controller executing the instructions to operate as a first obtaining unit to obtain incidental information accompanying a reference image selected by a user, a setting unit to set information about permission of printing an image according to a user's operation, a second obtaining unit to obtain a print target image, and a decision unit to decide whether to permit printing of the print target image based on incidental information accompanying the print target image and a print permission condition set based on the incidental information accompanying the reference image and the information set according to the user's operation.

10 Claims, 10 Drawing Sheets

(56) References Cited

U.S. PATENT DOCUMENTS

| | | | | |
|---|---|---|---|---|
| 9,077,823 B1* | 7/2015 | Grosz | ................ | H04N 1/00177 |
| 9,219,830 B1* | 12/2015 | Ciorba | ............... | H04N 1/00177 |
| 9,329,762 B1* | 5/2016 | Schultz | ................ | G06F 40/166 |
| 10,395,297 B1* | 8/2019 | Ivie | ........................ | H04L 63/08 |
| 2004/0257593 A1* | 12/2004 | Moffatt | ................ | G06F 3/1205 |
| | | | | 358/1.9 |
| 2005/0219367 A1* | 10/2005 | Kanda | ................ | H04N 1/00209 |
| | | | | 348/207.2 |
| 2010/0277615 A1* | 11/2010 | Watazawa | .............. | H04N 5/772 |
| | | | | 348/231.5 |
| 2014/0193047 A1* | 7/2014 | Grosz | ................... | G06Q 10/10 |
| | | | | 382/118 |
| 2014/0195921 A1* | 7/2014 | Grosz | ................ | G06Q 30/0601 |
| | | | | 715/738 |
| 2017/0132224 A1* | 5/2017 | Yang | ....................... | G06F 16/58 |

* cited by examiner

FIG. 5D

Print Condition Setting

- ☐ Shooting Date and Time
- ☐ Shooting Location
- ☐ Model of Image Pickup Apparatus
- ☐ Serial No. of Image Pickup Apparatus

SET

FIG. 5E

Shooting Location

Reference Image Information:
North Latitude    35° 33' 59"
East Longitude   139° 40' 56"

[ ] m or less

SET

FIG. 5F

Shooting Location Information

5|

| 1 | 2 | 3 | 4 | 5 | 6 | 7 | 8 | 9 | 0 | ⊠ |

△ ◁ ▷ ▽

SET

FIG. 5H

Print Condition Setting
- ☐ Date and Time
- ☑ Shooting Location Information
- ☐ Model of Image Pickup Apparatus
- ☐ Serial No. of Image Pickup Apparatus

BACK | SET

FIG. 5G

Shooting Location Information

Reference Image Information:
North Latitude 35° 33' 59"
East Longitude 139° 40' 56"

50 m or less

SET

FIG. 5I

Direct Connection

Waiting for Receiving Image....

EDIT | SSID / Display Password

IMAGE PRINTING APPARATUS PRINTING OBTAINED IMAGE BASED ON A SATISFIED PRINT PERMISSION CONDITION, CONTROL METHOD THEREFOR, AND STORAGE MEDIUM STORING CONTROL PROGRAM THEREFOR

BACKGROUND OF THE INVENTION

Field of the Invention

The present invention relates to an image printing apparatus that prints an obtained image, a control method therefor, and a storage medium storing a control program therefor.

Description of the Related Art

There is a known conventional image printing apparatus that directly obtains an image taken by an image pickup apparatus, such as a digital camera or a mobile phone, through a wired I/F like USB or a wireless I/F like Wi-Fi and prints the image. When this image printing apparatus permits printing through the wireless I/F, for example, the image printing apparatus may be used unjustly. Accordingly, Japanese Laid-Open Patent Publication (Kokai) No. 2008-270934 (JP 2008-270934A) discloses an image printing apparatus that refuses printing in a case where a type of a connected digital camera or a print target image does not satisfy a print permission condition.

However, the above-mentioned publication does not disclose a timing and method for setting the print permission condition. Generally, values of various setting items in an image printing apparatus are set through a setting menu. For example, when a printing apparatus has an internal clock, restriction by a shooting date/time is easily set as the print permission condition. However, when a printing apparatus does not have a clock in particular, operations for selecting starting date/time and ending date/time that define a print permission term of the shooting date/time are troublesome. Moreover, when restriction by a shooting location is set as a print permission condition, operations for setting latitude and longitude of a shooting location are troublesome when a printing apparatus does not have a shooting location detecting function in particular.

SUMMARY OF THE INVENTION

The present invention provides a technique that simplifies setting of a print permission condition of an image.

Accordingly, a first aspect of the present invention provides an image printing apparatus including a first obtaining unit configured to obtain incidental information accompanying a reference image, a setting unit configured to set a print permission condition according to the incidental information obtained by the first obtaining unit, a second obtaining unit configured to obtain a print target image, and a decision unit configured to decide printing propriety of the print target image based on incidental information accompanying the print target image and the print permission condition set by the setting unit.

Accordingly, a second aspect of the present invention provides a control method for an image printing apparatus including obtaining incidental information accompanying a reference image, setting a print permission condition based on the incidental information obtained, and deciding printing propriety of an image instructed to print based on incidental information accompanying the image and the print permission condition.

Accordingly, a third aspect of the present invention provides a non-transitory computer-readable storage medium storing a control program causing a computer to execute the control method of the second aspect.

According to the present invention, setting of the print permission condition of an image is simplified.

Further features of the present invention will become apparent from the following description of exemplary embodiments with reference to the attached drawings.

BRIEF DESCRIPTION OF THE DRAWINGS

FIG. 5A through FIG. 5I are views showing examples of print-permission-condition setting screens in the embodiment.

DESCRIPTION OF THE EMBODIMENTS

Figure 1:
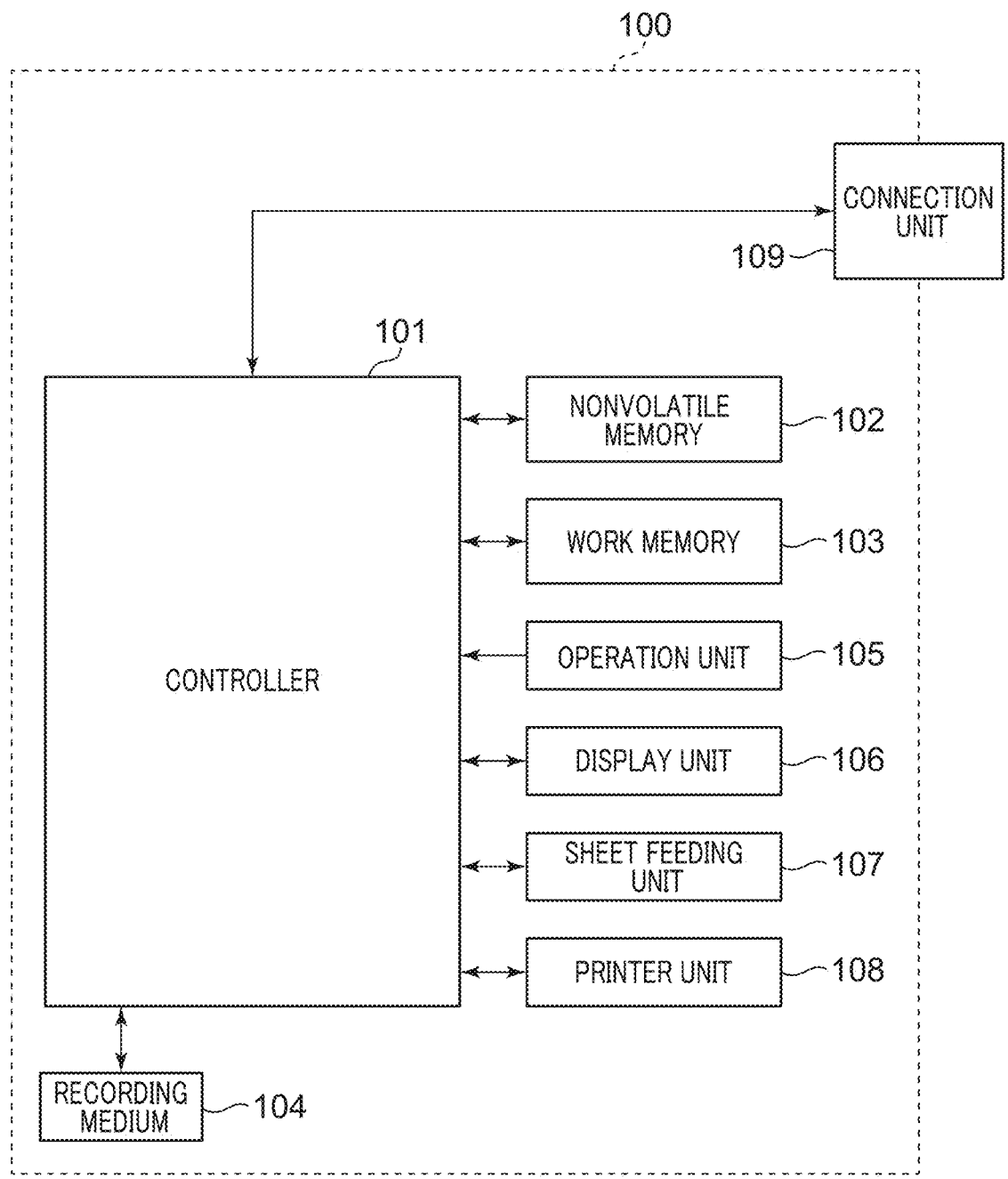
FIG. 1 is a block diagram schematically showing an image printing apparatus according to an embodiment of the present invention.

Hereafter, embodiments according to the present invention will be described in detail by referring to the drawings.

FIG. 1 is a block diagram schematically showing an image printing apparatus according to an embodiment of the present invention. The image printing apparatus 100 has a controller 101 that consists of a CPU etc. The controller 101 controls various sections of the image printing apparatus 100 according to a control program and controls an input signal. It should be noted that the entire apparatus may be controlled with a plurality of hardware units by sharing the process instead of controlling the entire apparatus with the controller 101.

A nonvolatile memory 102 is an EEPROM that stores a control program etc. that are executed by the controller 101. A work memory 103 consists of a RAM etc. and is used as a work memory for the controller 101 executing a process, an image display memory for a display unit 106, or a buffer memory that temporarily saves image data received from a connection unit 109.

A recording medium 104 holds image data etc. The recording medium 104 may be configured to be detachable from the image printing apparatus 100 or may be built in the image printing apparatus 100. The image printing apparatus 100 at least has a function that accesses the recording medium 104. An operation unit 105 is used in order to receive an instruction to the image printing apparatus 100 from a user. The operation unit 105 includes operating members, such as a power button used when a user instructs ON/OFF of power source of the image printing apparatus 100, a print start button for instructing printing, and a right-and-left button for instructing to switch a displayed image during reproduction of image data. Moreover, a touch panel formed on the display unit 106 is also included in the operation unit 105. The display unit 106 displays image data and characters for an interactive operation screen. It should be noted that the display unit 106 may not be built in the image printing apparatus 100. It is enough that the image printing apparatus 100 is connectable with the internal display unit 106 or an external display unit and at least has a display control function that controls the display of the display unit.

A feeding unit 107 stores recording sheets and conveys a recording sheet to a printing unit 108. It should be noted that a sensor or a switch that detects a size of a recording sheet may be provided in the feeding unit 107 so that the controller 101 can obtain the size of the stored recording sheet. Moreover, the feeding unit 107 may be configured to store the recording sheets of a plurality of sizes. It should be noted that the recording sheets are not limited to paper sheets and may be made from sheet material other than paper. The printing unit 108 prints an image on the recording sheet conveyed from the feeding unit 107.

The connection unit 109 is an interface for connecting with an external apparatus. The image printing apparatus 100 is able to exchange data with an external apparatus through the connection unit 109. The connection unit 109 includes an interface for communicating with an external apparatus through a wireless LAN. The controller 101 achieves wireless communication with an external apparatus by controlling the connection unit 109. It should be noted that the wireless communication method is not limited to the wireless LAN.

The image printing apparatus 100 is able to operate as a receiver device in the infrastructure mode of the wireless LAN. When operating as the receiver device, the image printing apparatus 100 is able to join in a network constituted by an access point (referred to as an "AP" in the following description) in the periphery by connecting with the AP. Moreover, the image printing apparatus 100 is able to operate as a simple AP that is a kind of AP of which function is more restricted. The simple AP is a relay device, for example. When the image printing apparatus 100 operates as the simple AP, the image printing apparatus 100 itself constitutes a network. An apparatus around the image printing apparatus 100 recognizes the image printing apparatus 100 as the AP and is able to join in the network constituted by the image printing apparatus 100. The program for operating the image printing apparatus 100 as mentioned above is stored in the nonvolatile memory 102.

Figure 2:
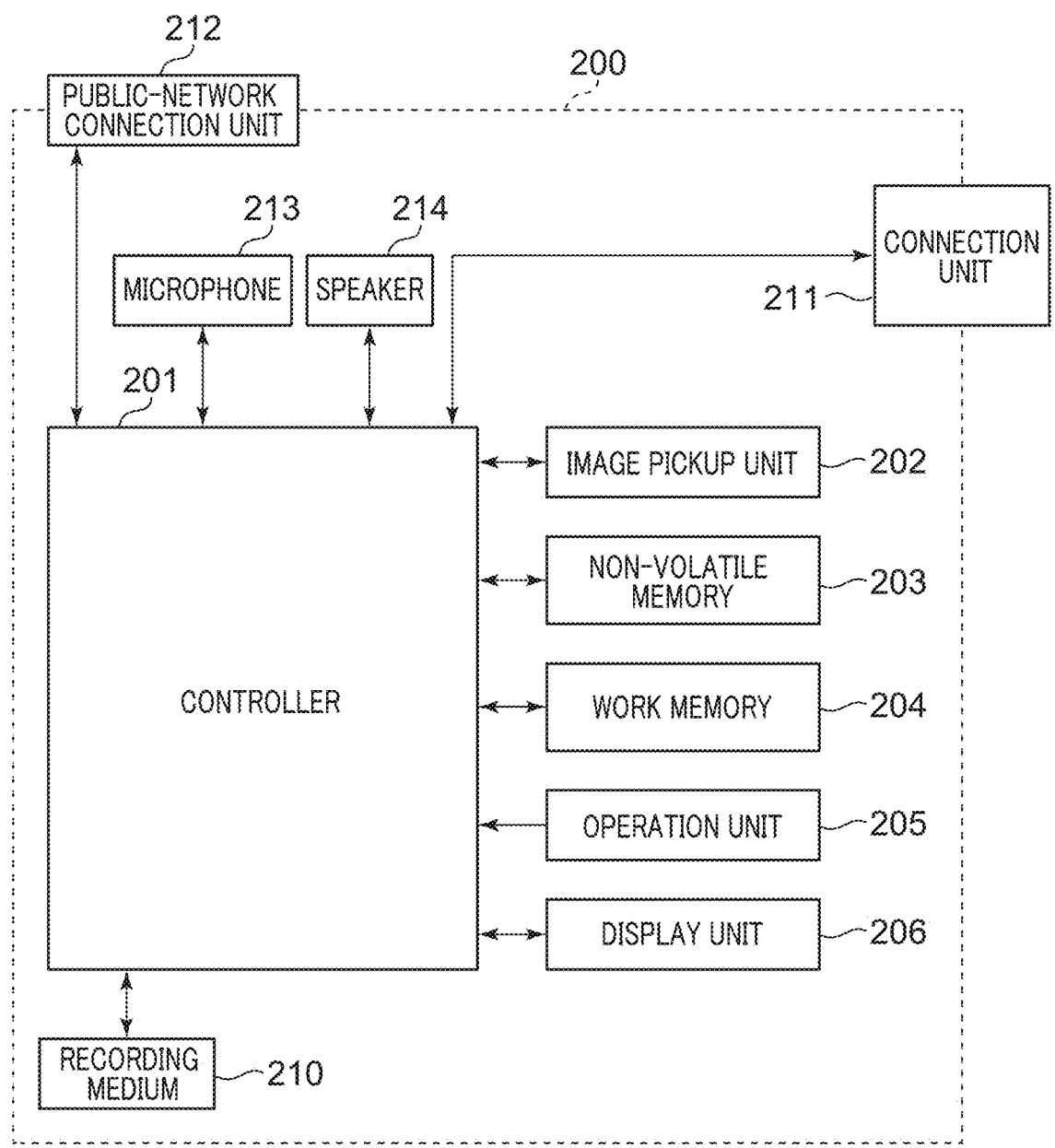
FIG. 2 is a block diagram of an external apparatus that communicates with the image printing apparatus in FIG. 1.

FIG. 2 is a block diagram of an external apparatus that communicates with the image printing apparatus 100. In the embodiment, a mobile phone 200 that is an image shooting apparatus is exemplified as an external apparatus that communicates with the image printing apparatus 100. However, the external apparatus is not limited to the mobile phone. For example, a digital camera with a wireless communication function, a mobile media player, a tablet device, a personal computer, and a smart phone may be used as external apparatuses that handle an image shooting function and an image.

The mobile phone 200 has a controller 201 that consists of a CPU etc. The controller 201 controls various sections of the mobile phone 200 according to a control program and controls an input signal. It should be noted that the entire mobile phone 200 may be controlled with a plurality of hardware units by sharing the process instead of controlling the entire apparatus with the controller 201.

An image pickup unit 202 converts an object image formed by object light through a lens included in the image pickup unit 202 into an electric signal, performs a noise reduction process etc., and outputs digital data as image data. The picked-up image data is once stored in a buffer memory, is subjected to a predetermined calculation by the controller 201 and is recorded into the recording medium 210. A nonvolatile memory 203 is an EEPROM that stores various programs etc. that are executed by the controller 201. A program for communicating with the image printing apparatus 100 shall also be stored in the nonvolatile memory 203 and shall be installed as a print application. Processes in the mobile phone 200 in this embodiment are achieved by reading programs provided by the print application. Moreover, the print application shall have a program for using a fundamental function of an OS installed in the mobile phone 200. It should be noted that the OS of the mobile phone 200 may have a program to achieve the processes in this embodiment.

A work memory 204 is constituted by a RAM etc. and is used as the buffer memory that temporarily saves the image data generated by the image pickup unit 202, an image display memory of a display unit 206, a work area of the controller 201, etc. An operation unit 205 is used in order to receive an instruction to the mobile phone 200 from a user. The operation unit 205 includes operating members, such as a power button used when a user instructs ON/OFF of power source of the mobile phone 200, and a touch panel formed on the display unit 206. The display unit 206 displays image data and characters for an interactive operation screen. It should be noted that the display unit 206 may not be built in the mobile phone 200. That is, it is enough that the mobile phone 200 is connectable with an external display unit and at least has a display control function that controls the display of the display unit.

The recording medium 210 is able to record the image data output from the image pickup unit 202. The recording medium 210 may be detachably attached to the mobile phone 200 or may be built in the mobile phone 200. The mobile phone 200 at least has a function that accesses the recording medium 210.

A connection unit 211 is an interface for connecting with the image printing apparatus 100. The mobile phone 200 is able to exchange data with the image printing apparatus 100 through the connection unit 211. The connection unit 211 includes an interface for communicating with the image printing apparatus 100 through the wireless LAN. The controller 201 achieves the wireless communication with the image printing apparatus by controlling the connection unit 211. It should be noted that the mobile phone 200 is able to operate as a receiver device at least in the infrastructure mode and to join in a network formed by an AP in the vicinity.

A public-network connection unit 212 is an interface used when performing public wireless communication. The mobile phone 200 is able to perform a telephone call and data communication with another apparatus through the public-network connection unit 212. During a telephone call, the controller 201 outputs and inputs a voice signal through a speaker 214 and a microphone 213. In the embodiment, the public-network connection unit 212 shall include an interface for communicating using 3G (3rd generation) mobile communication standard. It should be noted that communication methods, such as LTE (Long Term Evolution) and WiMAX (Worldwide Interoperability for Microwave Access), may be used in place of the 3G. Moreover, other communication methods, such as ADSL (Asymmetric Digital Subscriber Line), FTTH (Fiber To The Home), and what is called 4G (4th Generation) may be used. Moreover, the connection unit 211 and the public-network connection unit 212 are not necessarily constituted from independent hardware units. For example, they may share a single antenna.

Figure 3A:
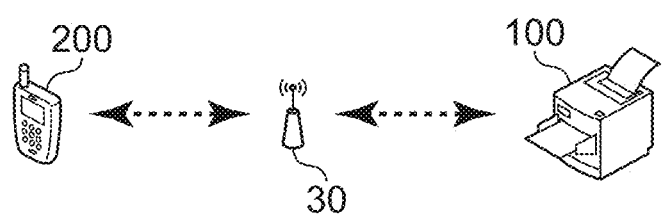
FIG. 3A and FIG. 3B are views showing network configuration examples in which the image printing apparatus in FIG. 1 and the external apparatus in FIG. 2 are connected.
Figure 3B:
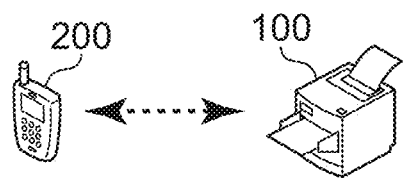

FIG. 3A and FIG. 3B are views showing network configuration examples in which the image printing apparatus 100 and the mobile phone 200 are connected. The two communication configurations shown in FIG. 3A and FIG. 3B are considered as main data communication configurations in the case where the image printing apparatus 100 and the mobile phone 200 exchange data through the wireless LAN.

The communication configuration shown in FIG. 3A is the first data communication configuration in which the image printing apparatus 100 and the mobile phone 200 join in a wireless LAN network that is provided by an external AP 30 as an example of an external relay device. The image printing apparatus 100 and the mobile phone 200 detect a beacon signal that the external AP 30 transmits periodically and join in the wireless LAN network provided by the external AP 30. After joining in the same wireless LAN network, the image printing apparatus 100 and the mobile phone 200 mutually discriminate the opposite apparatuses, obtain performances of the opposite apparatuses, and establish connection through the wireless LAN.

The communication configuration shown in FIG. 3B is the second data communication configuration in which the image printing apparatus 100 and the mobile phone 200 connect directly without using the external AP 30. In this communication configuration, the image printing apparatus 100 operates as a simple AP and provides a wireless LAN network. When operating as the simple AP, the image printing apparatus 100 starts periodical transmission of the beacon signal. The mobile phone 200 detects the beacon signal and joins in the wireless LAN network that the image printing apparatus 100 provides. Then, connection is established through mutual apparatus discrimination and performance obtainment as with the case in FIG. 3A, which enables data exchange.

It should be noted that the image printing apparatus 100 does not have a communication function to external networks, such as the Internet, as mentioned above. Accordingly, the mobile phone 200 that joins in the wireless LAN network provided by the image printing apparatus 100 cannot send data to the Internet etc. through the simple AP.

As mentioned above, the two communication configurations are considered as the data communication configurations between the image printing apparatus 100 and the mobile phone 200. When operating as the simple AP, the image printing apparatus 100 is able to decide a network identifier, encryption information, an encryption key, and a use channel of the wireless LAN network provided.

Figure 4:
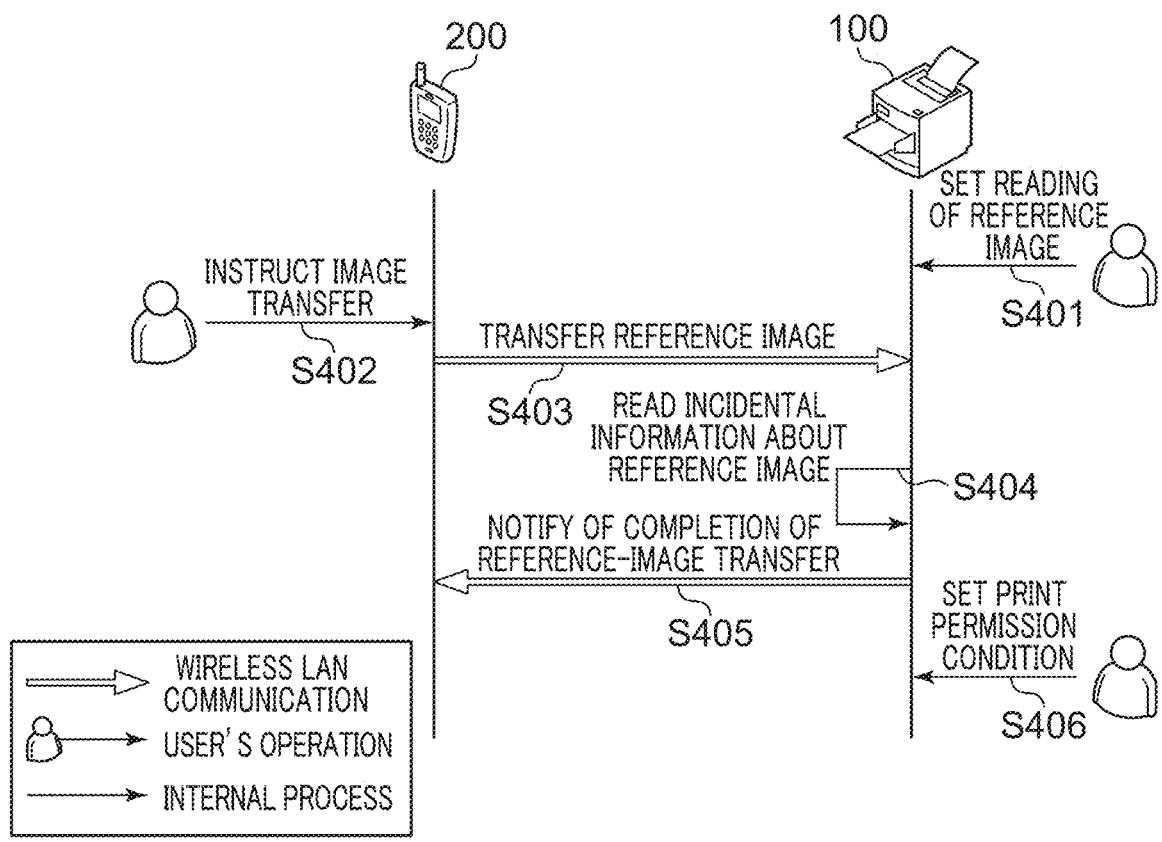
FIG. 4 is a view showing a sequence of setting a print permission condition in the embodiment.

Next, a setting flow of a print permission condition will be described by referring to FIG. 4 and FIG. 5A through FIG. 5I. FIG. 4 is a view showing a sequence of a print-permission-condition setting. FIG. 5A through FIG. 5I are views showing examples of screens for setting a print permission condition. Each setting screen is displayed on the display unit 106. A print permission condition is used to decide whether printing of an image that is required to be printed (that is instructed to print) is permitted. Any of the data communication configurations in FIG. 3A and FIG. 3B may be employed. A description about a relay process of the external AP 30 in a case of employing the data communication configuration in FIG. 3A is omitted.

Figure 5A:
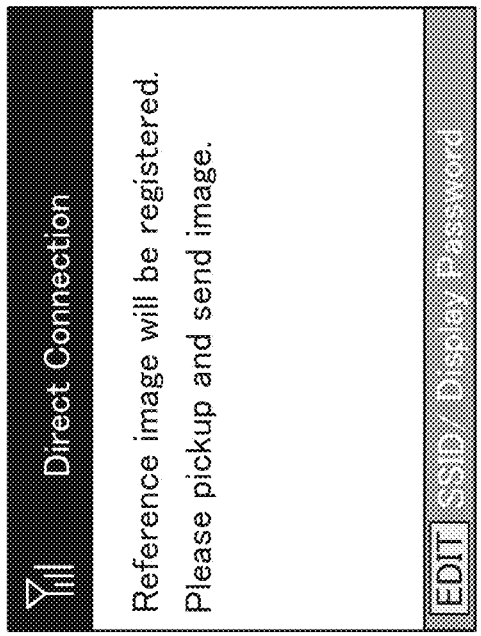
Figure 5B:
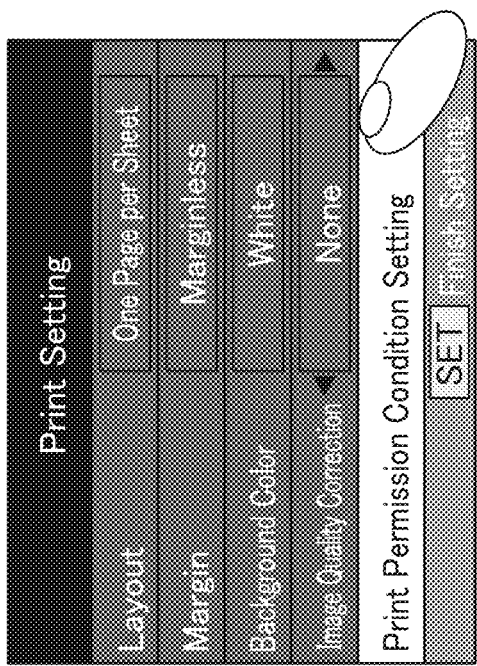

A menu screen shown in FIG. 5A is displayed when an instruction for a print setting is input to the operation unit 105. In step S401 in FIG. 4, when a user selects an item of "Print Permission Condition Setting" on the menu screen (FIG. 5A), the image printing apparatus 100 transits to a reference-image-reception waiting state. At this time, the image printing apparatus 100 prompts a user to select and transfer a reference image by displaying a reference-image-reception waiting screen as shown in FIG. 5B. Selection of a reference image in the mobile phone 200 shall be performed by a shooting operation after the transition to the reference-image-reception waiting state in this embodiment. It should be noted that the mobile phone 200 may select a reference image from among shot images in the mobile phone 200.

The reference image is used as a reference for setting the print permission condition. "Incidental information" accompanies the reference image. This incidental information is information that generally accompanies a shot image. The incidental information about the reference image includes items, such as shooting date/time of the image, a shooting location (shooting position) of the image, a model name (apparatus model name) of an apparatus that is used to shoot the image, and an individual identifier (serial number) of the apparatus. Other items may be included.

When the user operates the mobile phone 200 to instruct image transfer in step S402, the mobile phone 200 transfers the image to the image printing apparatus 100 through the network, such as a wireless LAN, in step S403. The image transferred in this step becomes the reference image. It should be noted that the mobile phone 200 is able to recognize that the image printing apparatus 100 is in the reference-image-reception waiting state. Accordingly, the mobile phone 200 may prohibit selecting the reference image from among past images recorded in the recording medium 210. In such a case, the reference image is selected from among only images shot through the image pickup unit 202 on the spot. It should be noted that the reference image may not be selected from among the images obtained by the mobile phone 200 but may be selected from among images recorded in the image printing apparatus 100 by the operation from the mobile phone 200. In that case, the image printing apparatus 100 obtains the reference image from among the images stored in itself according to a selection instruction from the mobile phone 200.

Figure 5C:
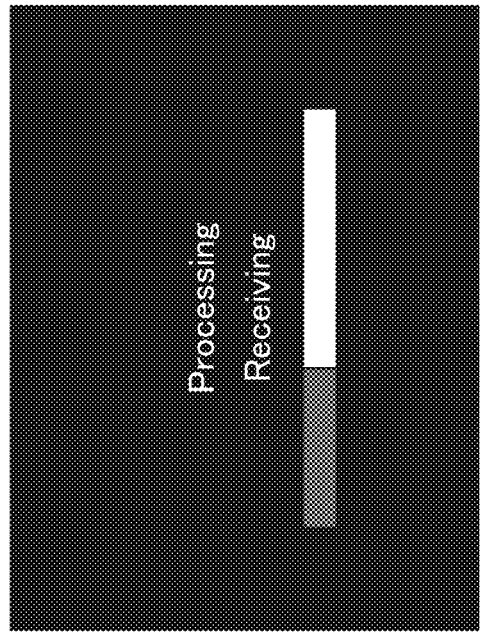

The image printing apparatus 100 receives the reference image transferred in the step S403, obtains the incidental information by reading it from the received reference image, and analyzes the obtained incidental information in step S404. During this process, an image receiving screen shown in FIG. 5C is displayed. When the analysis of the incidental information is completed, the image printing apparatus 100 notifies the mobile phone 200 of transfer completion in step S405. The step S405 may be performed before the step S404. After completion of the analysis of the incidental information about the received reference image, the image printing apparatus 100 sets the print permission condition on the basis of the incidental information about the reference image in step S406. First, the image printing apparatus 100 displays at least one item to which the print permission condition is set on a setting screen shown in FIG. 5D. The user is able to select an item to which the print permission condition is set in this setting screen. When the item is selected, the image printing apparatus 100 displays a detailed setting screen (FIG. 5E).

The items that are settable as the print permission condition are included in the above-mentioned incidental information, and a value is set for each item. For example, a range (radius) around a center position that appoints a circular permission range is set about the shooting location in addition to latitude and longitude of the center position. Date and time of shooting can be set about the shooting date/time. A permission time range before and after the date and time of shooting may be settable. A plurality of items can be set as the print permission condition. As an example, when the "Shooting Location" is selected on the setting screen (FIG. 5D), the latitude and longitude are displayed as values obtained from the incidental information about the reference image on the detailed setting screen (FIG. 5E). Furthermore, an input column into which a user enters a range (radius) around a center position in a meter unit is displayed. The range around the center position may be defined as a default value without requiring a user's entry.

A user operates the operation unit 105 of the image printing apparatus 100 to set the print permission condition. For example, when the input column on the detailed setting screen (FIG. 5E) is touched, the controller 101 displays a software keyboard screen shown in FIG. 5F and receives an input value from the user. Then, the inputted value (less than 50 m) is displayed as shown in FIG. 5G. When the user presses a "SET" button, the setting of the current item is completed and a mark (a check mark etc.) indicating that the setting of the item has been completed is added (FIG. 5H). The same setting operation that is available on the screen in FIG. 5D can be performed on the setting screen in FIG. 5H. When a "SET" button (setting completion button) is pressed on the screen in FIG. 5H, it is determined that the settings about all the items that the user desires to set have been completed. Accordingly, the image printing apparatus 100 stores the set-up print permission condition to the work memory 103, the recording medium 104, or the nonvolatile memory 102. At the same time, the image printing apparatus 100 transits to a reception waiting state that waits for a print image to be received. The image printing apparatus 100 displays an image reception waiting screen (FIG. 5I) in the reception waiting state.

A user is able to set the print permission condition easily by using the incidental information about the received reference image without performing complicated operations. It should be noted that the print permission condition that is set beforehand may be updated on the basis of the incidental information about the reference image received first after the setting.

Figure 6:
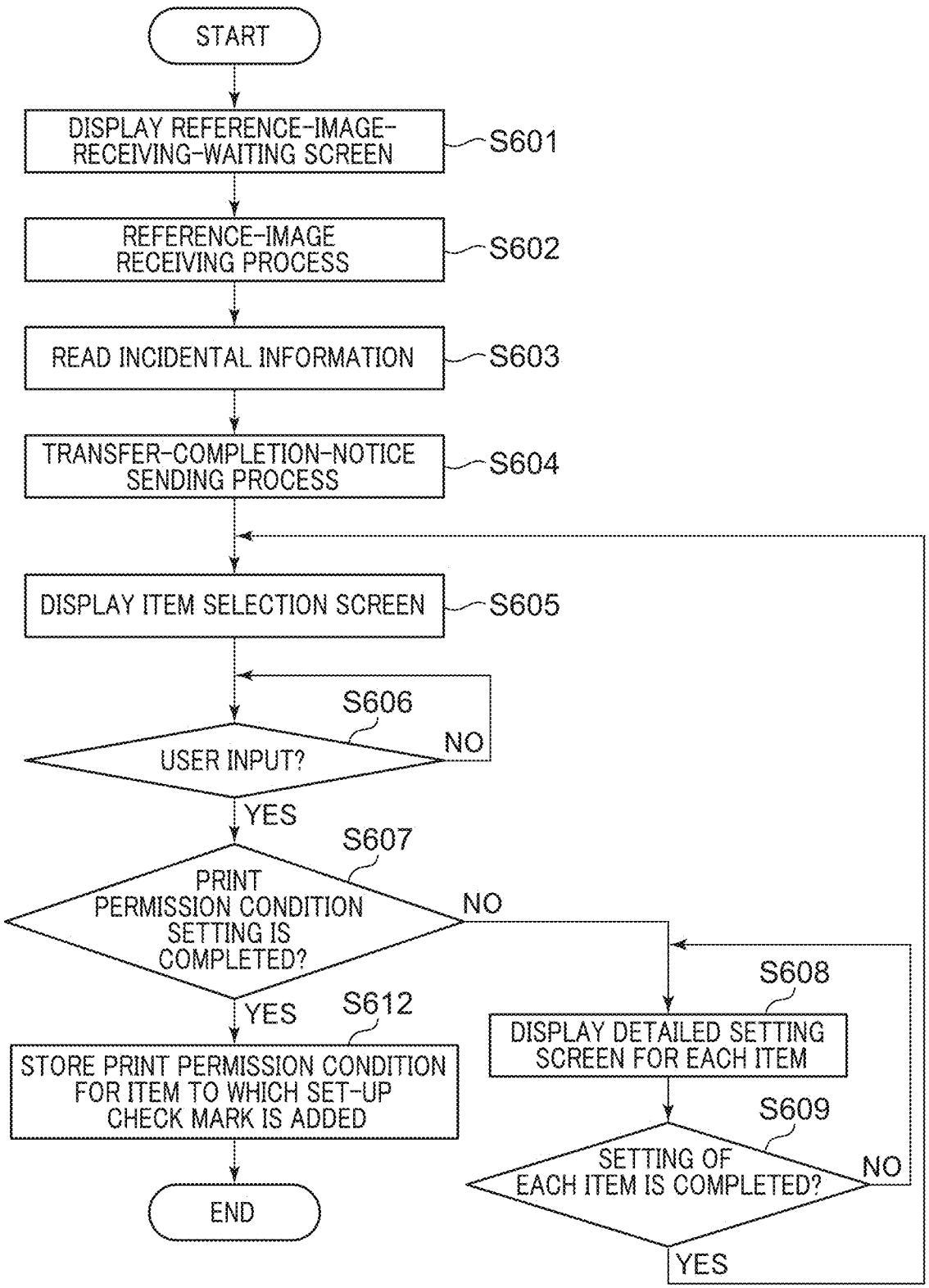
FIG. 6 is a flowchart of a print-permission-condition setting process in the embodiment.

FIG. 6 is a flowchart showing a print-permission-condition setting process. This process is achieved when the controller 101 develops a program stored in the nonvolatile memory 102 to the work memory 103 and runs it. The process in FIG. 6 is started when a user selects the item of "Print Permission Condition Setting" on the menu screen shown in FIG. 5A. In the process in FIG. 6, the controller 101 plays roles of the first obtaining unit, second obtaining unit, setting unit, and decision unit in the present invention.

In step S601, the controller 101 displays the reference-image-reception waiting screen (FIG. 5B) on the display unit 106 to prompt a user to transmit a reference image and waits to start image transfer from the mobile phone 200 through the connection unit 109. When the transfer of the reference image is started from the mobile phone 200, the controller 101 displays the image receiving screen (FIG. 5C) on the display unit 106 and performs a process for receiving the reference image through the connection unit 109 in step S602 (S403). The controller 101 may store the received image to the recording medium 104 or the work memory 103.

When the reception of the reference image is completed, the controller 101 reads the incidental information accompanying the received reference image and analyzes the portion required for setting the print permission condition in the incidental information in step S603 (S404). In step S604 (S405), the controller 101 notifies the mobile phone 200 that the reference image reception has been completed through the connection unit 109. The step S604 may be performed before the step S603. Some communication protocols between the mobile phone 200 and the image printing apparatus 100 allow the mobile phone 200 to detect the completion of the image reception without notifying of the completion of the reference image reception in the step S604. In such a case, the step S604 may be omitted. Alternatively, the controller 101 may make the mobile phone 200 detect the completion of the reference image reception by cutting the communication I/F between the mobile phone 200 and the image printing apparatus 100.

When the analysis of the incidental information about the reference image is completed, the controller 101 displays the setting screen (FIG. 5D) on the display unit 106 in step S605 (S406) for selecting an item to which the print permission condition is set. Then, the controller 101 waits for a user's operation to the operation unit 105 in step S606. Since the user's operation to the operation unit 105 decides the item of the current setting target, the controller 101 determines whether the user's operation in the step S606 is an operation (press of the setting completion button) that means the completion of the print-permission-condition setting in step S607. Then, when determining that the user's operation does not means the completion of the print-permission-condition setting, the controller 101 displays the print permission condition based on the incidental information analyzed in the step S605 and a value of each item as the detailed setting screen (FIG. 5E) in step S608. After that, the controller 101 proceeds with the process to step S609.

In the step S609, the controller 101 determines whether the setting of the print permission condition about the item as the current setting target is completed (whether the SET button has been pressed). Then, when determining that the setting of the print permission condition is not completed, the controller 101 returns the process to the step S608. The controller 101 sets a value and a range about the item as the current setting target according to user's instructions on the detailed setting screen that is displayed while repeating the steps S608 and S609 as mentioned above. Moreover, the controller 101 displays the software keyboard screen (FIG. 5F) or displays the value received (FIG. 5G) for some items.

When determining that the setting of the print permission condition has been completed in the step S609, the controller 101 returns the process to the step S605. In this case, when there is a set-up item, the setting screen as shown in FIG. 5H is displayed in the step S605. Thereby, the user visually recognizes the set-up item.

When determining that the user's operation in the step S606 is the operation (press of the setting completion button) that means the completion of the print-permission-condition setting in step S607, the controller 101 proceeds with the process to step S612. The controller 101 stores the value of the item, which has been set in the process in the steps S608 and S609, to the work memory 103, the recording medium 104, or the nonvolatile memory 102 in the step S612 (S406) as the print permission condition, and finishes the series of processes.

It should be noted that the mobile phone 200 may transfer a part of the reference image file including the incidental information in the reference image transfer in the step S403 in FIG. 4 and in the reference image reception process in the step S602 in FIG. 6 instead of transferring the entire reference image file. That is, the controller 101 may receive only an incidental information section required for the print-permission-condition setting. Moreover, even when the entire reference image is received in the steps S602 and S603, only the incidental information section required for the print-permission-condition setting may be stored in the recording medium 104 or the work memory 103 instead of storing the entire received image.

When a plurality of items are set as the print permission condition, a combination of the items may be set in the step S406 in FIG. 4 and the step S612 in FIG. 6. That is, a condition that determines whether each of the items is actually applied may be set. For example, when a plurality of items are set as the print permission condition, a logical product (AND) condition or a logical addition (OR) condition may be set. Otherwise, a user may set a conditional expression.

Figure 7:
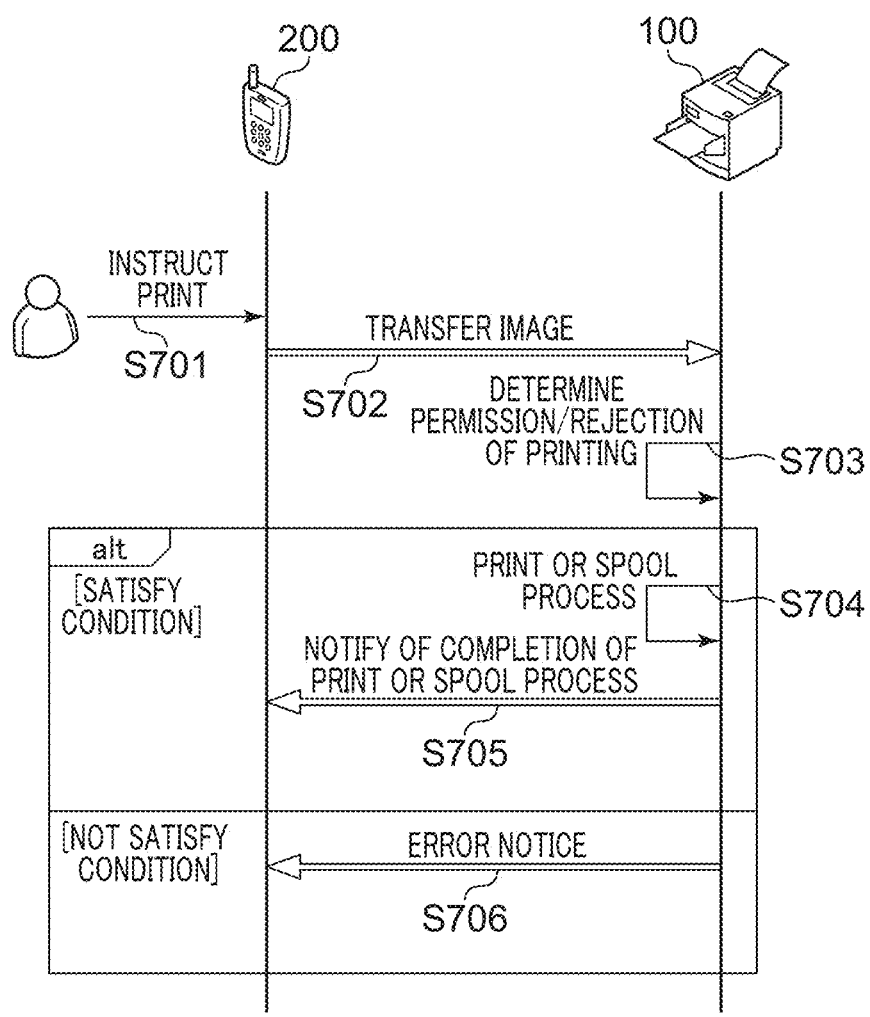
FIG. 7 is a view showing a sequence of printing in the embodiment.

Next, a flow of a print process will be described by referring to FIG. 7. FIG. 7 is a view showing a sequence of printing. A user enters a print instruction by operating the mobile phone 200 to start the print process in step S701. In step S702, when a print instruction image (an image that the user requires to print) is transferred to the image printing apparatus 100 from the mobile phone 200, the image printing apparatus 100 receives the print instruction image. This print instruction image becomes a print target image. In step S703, the image printing apparatus 100 decides printing propriety of the print instruction image on the basis of the print permission condition stored and the incidental information accompanying the print instruction image. That is, the image printing apparatus 100 decides whether the print instruction image should be printed. When determining that the incidental information about the print instruction image satisfies (agrees with) the print permission condition, the image printing apparatus 100 permits printing and executes a print operation in step S704. When the image printing apparatus 100 is printing another image or is set to print a plurality of images in one sheet, the print operation cannot be started promptly. In such a case, the image printing apparatus 100 may execute a spool process that temporarily stores the received print instruction image inside the image printing apparatus 100. When the print or spool process for the print instruction image is completed, the image printing apparatus 100 notifies the mobile phone 200 of the completion of the print or spool process in step S705.

In the meantime, when determining that the incidental information about the print instruction image does not satisfy (disagrees with) the print permission condition in the step S703, the image printing apparatus 100 sends an error notice indicating that the image has not been printed to the mobile phone 200 in step S706.

It should be noted that the image printing apparatus 100 decides the printing propriety of the print instruction image in the step S703 after receiving the print instruction image in the above description. In the meantime, the image printing apparatus 100 may notify the mobile phone 200 of the print permission condition beforehand so that the mobile phone 200 will restrict images that are selectable as a print instruction image on the basis of the print permission condition.

Figure 8:
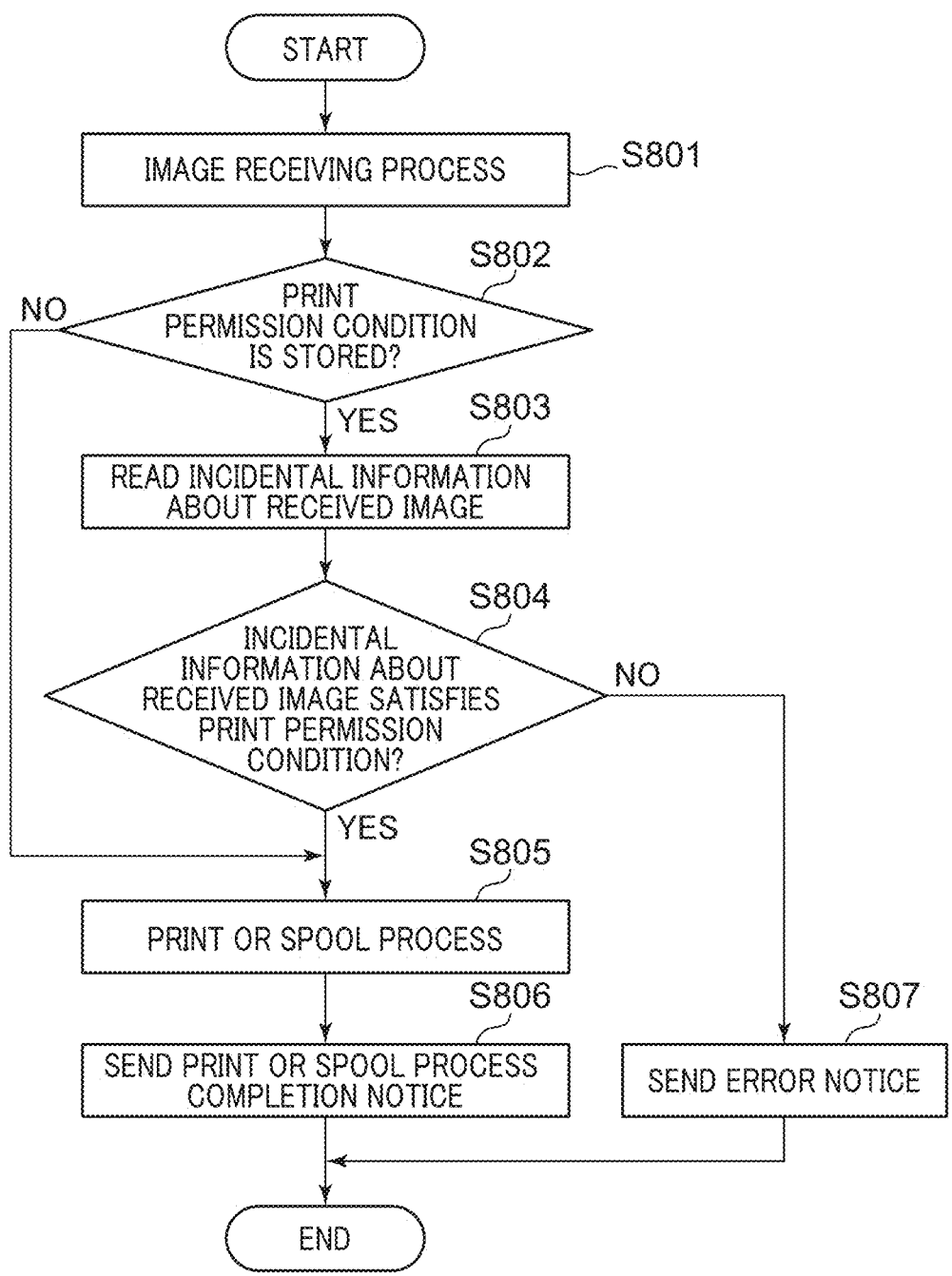
FIG. 8 is a flowchart of a print process in the embodiment.

FIG. 8 is a flowchart showing the print process. This process is achieved when the controller 101 develops a program stored in the nonvolatile memory 102 to the work memory 103 and runs it. When a user instructs to transfer an image that the user wants to print to the image printing apparatus 100 by operating the mobile phone 200, a print request of a print instruction image is transferred to the image printing apparatus 100. When the controller 101 receives the print request of the print instruction image from the mobile phone 200 through the connection unit 109, the process in FIG. 8 is started.

In step S801 (S702), the controller 101 performs a receiving process for the print instruction image with the connection unit 109. In this receiving process, the controller 101 stores the received print instruction image to the work memory 103, or the recording medium 104. When the reception of the print instruction image from the mobile phone 200 is completed, the controller 101 determines whether the print permission condition is stored in the recording medium 104, the nonvolatile memory 102, or the work memory 103 in step S802.

When determining that the print permission condition is not stored, the controller 101 proceeds with the process to step S805. In this case, the print instruction image is printed or spooled as long as there is not another restriction particularly. In the meantime, when determining that the print permission condition is stored, the controller 101 reads the incidental information from the received print instruction image in step S803. Then, the controller 101 determines whether the incidental information read from the print instruction image satisfies (agrees with) the print permission condition. For example, it is assumed that a range (radius) around a center position is set about the shooting location in addition to latitude and longitude of the center position as the print permission condition. If the shooting location that the incidental information reads from the print instruction image falls within the range around the center position, this print permission condition is satisfied.

Then, when determining that the incidental information satisfies the print permission condition, the controller 101 executes the print process or the spool process in step S805 (S704). Then, when the print process or the spool process for the print instruction image is completed, the controller 101 sends an image printing completion notice or a spool completion notice to the mobile phone 200 through the connection unit 109 in step S806 (S705). It should be noted that the controller 101 prints the print instruction image by controlling the feeding unit 107 and the printing unit 108 in the print process in the step S805. In the spool process, the controller 101 may transit to the next step while keeping the print instruction image in the work memory 103 or the recording medium 104 (a spool state). The controller 101 finishes the series of processes in FIG. 8 after the step S806.

In the meantime, when determining that the incidental information read from the print instruction image does not satisfy (disagrees with) the print permission condition in the step S804, the controller 101 proceeds with the process to step S807. In the step S807 (S706), the controller 101 sends the error notice showing that the image has not been printed to the mobile phone 200 through the connection unit 109. After that, the controller 101 finishes the series of processes in FIG. 8. It should be noted that the image printing apparatus 100 may obtain an image from a plurality of external apparatuses.

According to the embodiment, the controller 101 obtains the incidental information accompanying the reference image, sets the print permission condition on the basis of the obtained incidental information, and decides the printing propriety of the print instruction image on the basis of the incidental information accompanying the print instruction image and the print permission condition. The controller 101 permits printing when the incidental information about the print instruction image satisfies the print permission condition but does not permit printing when the information does not satisfy the print permission condition. Since it is not necessary to set the print permission condition by entering details one by one, the setting operation is not troublesome. For example, even if the image printing apparatus 100 has neither a clock nor a GPS function inside the apparatus, it is easy to set a restriction by a shooting date/time or a shooting location. Accordingly, the setting of the print permission condition for an image is simplified. Accordingly, the image printing apparatus 100 needs to have neither a clock function nor a GPS function.

Moreover, also when a plurality of images that are received from a plurality of mobile phones and are spooled are printed on one sheet, the print permission condition can be set by the easy method mentioned above. This avoids printing an unsuitable image, even if such an image is sent from another user (another mobile phone).

As mentioned above, although the present invention has been described in detail on the basis of the suitable embodiment, the present invention is not limited to the specific embodiment, and the present invention includes various configurations as long as they do not deviate from the scope of the invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164544, filed Sep. 3, 2018, which is hereby incorporated by reference herein in its entirety.

What is claimed is:

1. An image printing apparatus comprising:
   a memory containing instructions; and
   a controller executing the instructions to operate as:
   a first obtaining unit configured to obtain at least one of a shooting location or a shooting date/time of a reference image selected by a user;
   a setting unit configured to set at least one of a range of distances from the shooting location obtained by the first obtaining unit or a range of time periods from the shooting date/time obtained by the first obtaining unit, as a print condition, according to a user's operation;
   a decision unit configured to decide an image such that at least one of a shooting location and a shooting date/time of the image falls within the print condition set by the setting unit, as a print target image; and
   a print control unit configured to control an image decided by the decision unit as the print target image so as to be subjected to a print process.

2. The image printing apparatus according to claim 1, wherein the first obtaining unit obtains the reference image and obtains at least one of the shooting location or the shooting date/time from the obtained reference image.

3. The image printing apparatus according to claim 2, wherein the first obtaining unit prompts a user to select and transfer the reference image and receives the transferred image as the reference image.

4. The image printing apparatus according to claim 1, wherein a clock function is not provided.

5. The image printing apparatus according to claim 1, wherein the setting unit is able to set the range of distances from the shooting location obtained by the first obtaining unit and the range of time periods from the shooting date/time obtained by the first obtaining unit, as the print condition.

6. The image printing apparatus according to claim 1, further comprising a printer configured to print an image decided by the decision unit as the print target image.

7. The image printing apparatus according to claim 6, wherein the printer prints a plurality of images decided by the decision unit as the print target images on one sheet.

8. The image printing apparatus according to claim 1, wherein the decision unit is able to obtain images from a plurality of external apparatuses.

9. A control method for an image printing apparatus, the control method comprising:
   obtaining at least one of a shooting location or a shooting date/time of a reference image selected by a user;
   setting at least one of a range of distances from the shooting location obtained by the first obtaining unit or a range of time periods from the shooting date/time obtained by the first obtaining unit, as a print condition, according to a user's operation;
   deciding an image such that at least one of a shooting location and a shooting date/time of the image falls within the set print condition, as a print target image; and
   controlling an image decided as the print target image so as to be subjected to a print process.

10. A non-transitory computer-readable storage medium storing a control program causing a computer to execute a control method for an image printing apparatus, the control method comprising:
    obtaining at least one of a shooting location or a shooting date/time of a reference image selected by a user;
    setting at least one of a range of distances from the shooting location obtained by the first obtaining unit and a range of time periods from the shooting date/time obtained by the first obtaining unit, as a print condition, according to a user's operation;

deciding an image such that at least one of a shooting location or a shooting date/time of the image falls within the set print condition, as a print target image; and controlling an image decided as the print target image so as to be subjected to a print process.

* * * * *